(12) United States Patent
Tezaur et al.

(10) Patent No.: US 11,978,177 B2
(45) Date of Patent: May 7, 2024

(54) METHOD AND SYSTEM OF IMAGE PROCESSING OF OMNIDIRECTIONAL IMAGES WITH A VIEWPOINT SHIFT

(71) Applicant: Intel Corporation, Santa Clara, CA (US)

(72) Inventors: Radka Tezaur, Union City, CA (US); Niloufar Pourian, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 17/033,310

(22) Filed: Sep. 25, 2020

(65) Prior Publication Data

US 2021/0012454 A1     Jan. 14, 2021

(51) Int. Cl.
*G06T 3/20* (2006.01)
*G06T 3/60* (2006.01)

(52) U.S. Cl.
CPC . *G06T 3/20* (2013.01); *G06T 3/60* (2013.01)

(58) Field of Classification Search
CPC ............ G06T 3/0018; G06T 3/20; G06T 3/60
See application file for complete search history.

(56) References Cited

U.S. PATENT DOCUMENTS

| | | | | |
|---|---|---|---|---|
| 2006/0202985 A1* | 9/2006 | Kobayashi | ............... | G06T 15/04 345/419 |
| 2008/0144968 A1* | 6/2008 | Cohen | ..................... | G06T 3/047 352/69 |
| 2012/0268499 A1* | 10/2012 | Izumi | ........................ | G06T 3/20 345/682 |
| 2016/0062121 A1* | 3/2016 | Border | ............... | G02B 27/0176 359/630 |
| 2018/0035134 A1* | 2/2018 | Pang | .................... | H04N 13/117 |
| 2018/0322688 A1* | 11/2018 | Ozguner | .................. | G06T 3/20 |
| 2019/0012766 A1* | 1/2019 | Yoshimi | ................. | G02B 27/64 |
| 2019/0028640 A1 | 1/2019 | Kanda | .................. | H04N 23/631 |
| 2019/0199997 A1* | 6/2019 | Mizuno | .................... | G06T 7/70 |
| 2019/0213896 A1* | 7/2019 | Gohl | ........................ | G06V 20/13 |
| 2019/0385324 A1* | 12/2019 | Kume | ..................... | G06T 7/292 |
| 2020/0014905 A1* | 1/2020 | Oh | ..................... | H04N 21/8456 |
| 2020/0294269 A1 | 9/2020 | Tezaur | | |
| 2021/0250568 A1 | 4/2021 | Huang | | |
| 2021/0201855 A1* | 7/2021 | Kammachi-Sreedhar | .................. | H04N 13/183 |

FOREIGN PATENT DOCUMENTS

CN     110876051     3/2020

OTHER PUBLICATIONS

Nobuyuki Kita, "Evaluation of the Viewpoint Shift for a Fisheye Lens based on Stereo Geometry," Dec. 26, 2016, 2016 International Conference on Digital Image Computing: Techniques and Applications (DICTA), pp. 1-4.*

Donald B. Gennery, "Generalized Camera Calibration Including Fish-Eye Lenses", May 2006, International Journal of Computer Vision 68(3), 2006, pp. 239-246.*

(Continued)

*Primary Examiner* — Omar S Ismail

(74) *Attorney, Agent, or Firm* — Hanley, Flight & Zimmerman, LLC

(57) ABSTRACT

A method and system of image processing of omnidirectional images with a viewpoint shift.

25 Claims, 11 Drawing Sheets

(56) References Cited

OTHER PUBLICATIONS

Albert Parra Pozo, "An Integrated 6DoF Video Camera and System Design," Nov. 2019, ACM Transactions on Graphics, vol. 38, No. 6, Article 216, pp. 216:1-216:11.*

Pierre-André Brousseau, "Calibration of Axial Fisheye Cameras Through Generic Virtual Central Models," Oct. 2019, Proceedings of the IEEE/CVF International Conference on Computer Vision (ICCV), 2019, pp. 4040-4046.*

Nobuyuki Kita, "Evaluation of 3D Analysis Error Caused by SVP Approximation of Fisheye Lens," Mar. 2015, In Proceedings of the 10th International Conference on Computer Vision Theory and Applications—vol. 3: VISAPP, (VISIGRAPP 2015) ISBN 978-989-758-091-8, pp. 357-365.*

Avinash Kumar, "On the Equivalence of Moving Entrance Pupil and Radial Distortion for Camera Calibration," Dec. 2015, Proceedings of the IEEE International Conference on Computer Vision (ICCV), 2015, pp. 2345-2351.*

Brousseau, P.A., "Calibration of Axial Fisheye Cameras Through Generic Virtual Central Models", IEEE International Conference on Computer Vision (ICCV), pp. 4040-4048, 2019.

Gennery, D.B., "Generalized Camera Calibration Including Fish-Eye Lenses", International Journal of Computer Vision; 68 (3), pp. 239-266, 2006.

Kita, N., "Evaluation of 3D Analysis Error Caused by SVP Approximation of Fisheye Lens", In Proceedings of the $10^{th}$ International Conference on Computer Vision Theory and Applications (VISAAPP—2015), pp. 357-368.

Kita, N., "Evaluation of the Viewpoint Shift for a Fisheye Lens based on Stereo Geometry", International Conference on Digital Image Computing: Techniques and Applications (DICTA), 2016.

Kumar, A. et al., "On the Equivalence of Moving Entrance Pupil and Radial Distortion for Camera Calibration", IEEE International Conference on Computer Vision, 2015, pp. 2345-2353.

Pozo, A.P. et al., "An Integrated 6DoF Video Camera and System Design", ACM Transactions on Graphics, vol. 38, No. 6, Article 216, Nov. 2019.

Toscani, P. retrieved online via http://www.pierretoscani.com/fisheyes-(in-english).html on Aug. 6, 2020.

Combined Search and Examination Report for GB Application No. GB2111853.4, dated Apr. 5, 2022.

The Intellectual Property Office, "Patents Act 1977: Examination Report under Section 18(3)," issued in connection with Application No. GB2111853.4, dated Dec. 6, 2023, 2 pages.

* cited by examiner

100

200

FIG. 8      800
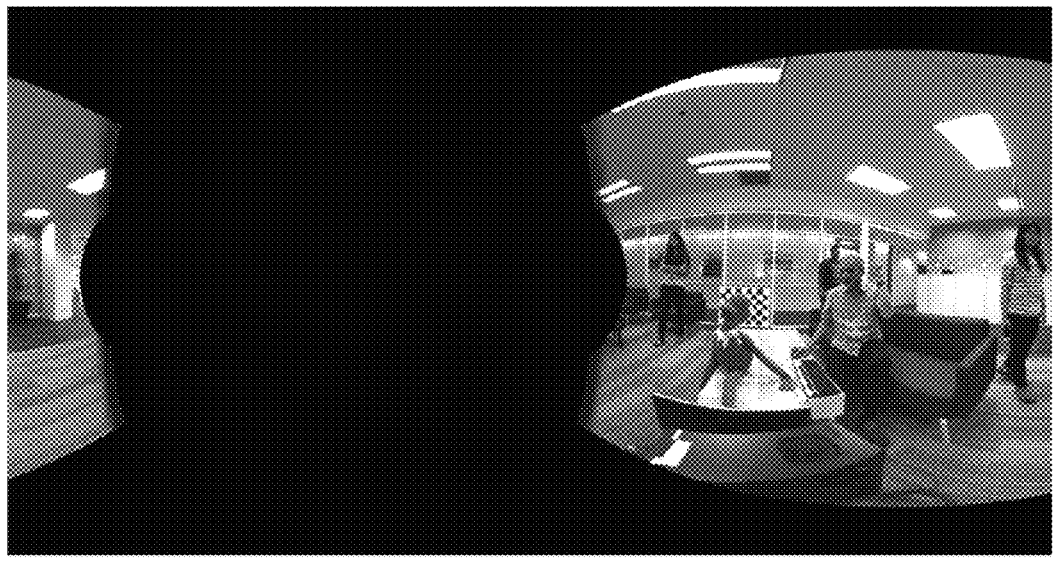
FIG. 9      900
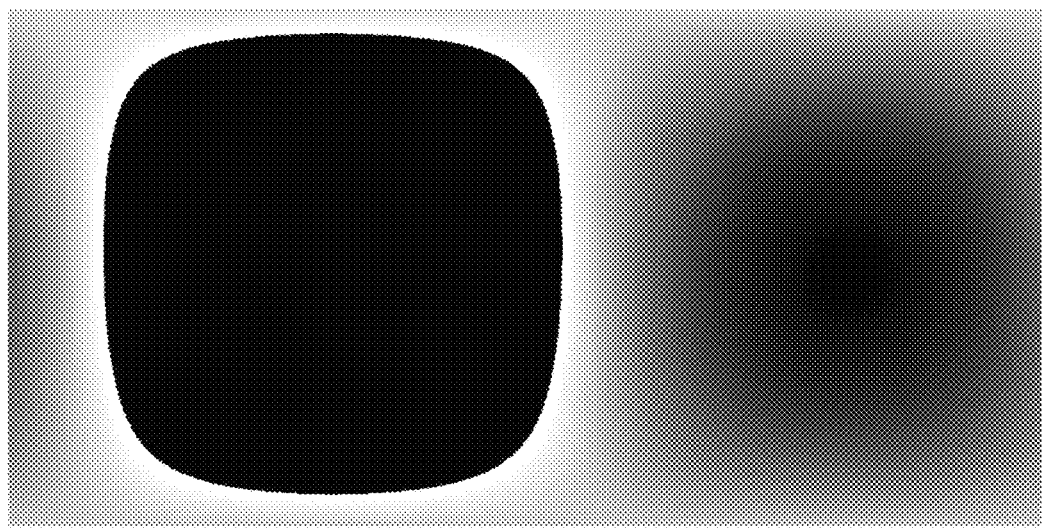
FIG. 11      1100
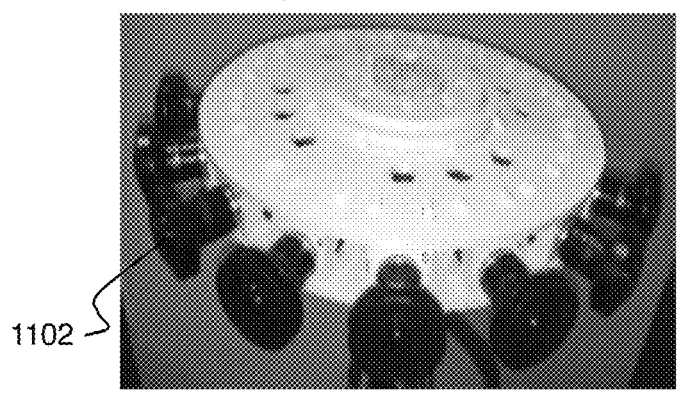

METHOD AND SYSTEM OF IMAGE PROCESSING OF OMNIDIRECTIONAL IMAGES WITH A VIEWPOINT SHIFT

BACKGROUND

Omnidirectional cameras such as cameras equipped with ultra wide-angle lenses may be used to capture images with a larger field of view (FOV) of a scene than the FOV of other types of lenses. A wide-angle lens refers to a lens whose focal length is smaller than the focal length of a normal lens for a given image format. For example, for a full-frame 35 mm camera with a 36 mm by 24 mm format, the diagonal measures 43.3 mm and by custom, the normal lens adopted by most manufacturers is 50 mm. A lens of focal length 35 mm or less on a full-frame 35 mm camera may therefore be considered wide-angle. Ultra wide-angle lenses or fisheye lenses often have focal lengths of 15 mm or less on a full-frame 35 mm camera. Fisheye lenses may have FOVs of up to 180 degrees or more, and an array of cameras with fisheye lenses can capture 360 degrees in all directions. Omnidirectional images are conventionally treated as central projections, ignoring the viewpoint shift due to the motion of entrance pupil of the lens, which causes significant and detectable errors in accuracy.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 8 is an image of a projected view of an omnidirectional image;
FIG. 9 is a viewpoint shift map according to at least one of the implementations herein;
FIG. 11 is an image of an example omnidirectional camera array according to at least one of the implementations herein.

DETAILED DESCRIPTION

Figure 1:
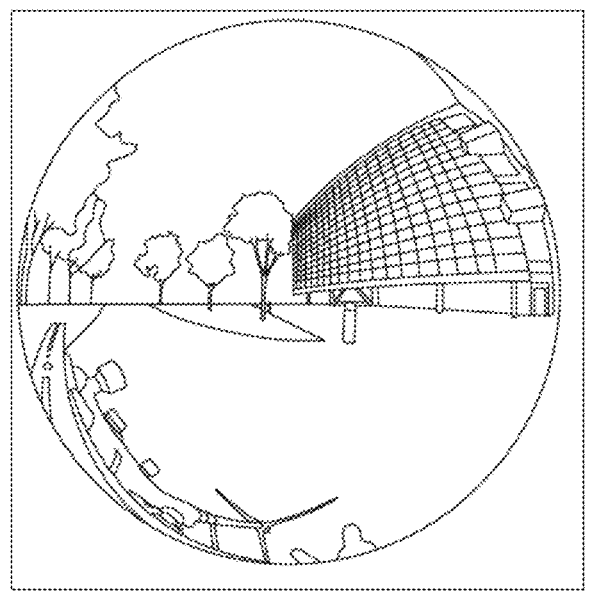
FIG. 1 is an example fisheye image.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices that handle image processing such as computers, computer networks, computing devices, servers, laptops, desktops, or image processing modules of professional or consumer electronic devices such as one or more cameras, camera security systems, medical scope systems, or on-board vehicle, drone, robotic, or other computer vision camera systems, imaging devices, digital cameras, smart phones, webcams, video cameras, video game panels or consoles, televisions, set top boxes, and so forth, may implement the techniques and/or arrangements described herein, and whether part of a single camera or multi-camera system. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

A method and system of image processing of omnidirectional images with a viewpoint shift is described as follows.

Figure 2:
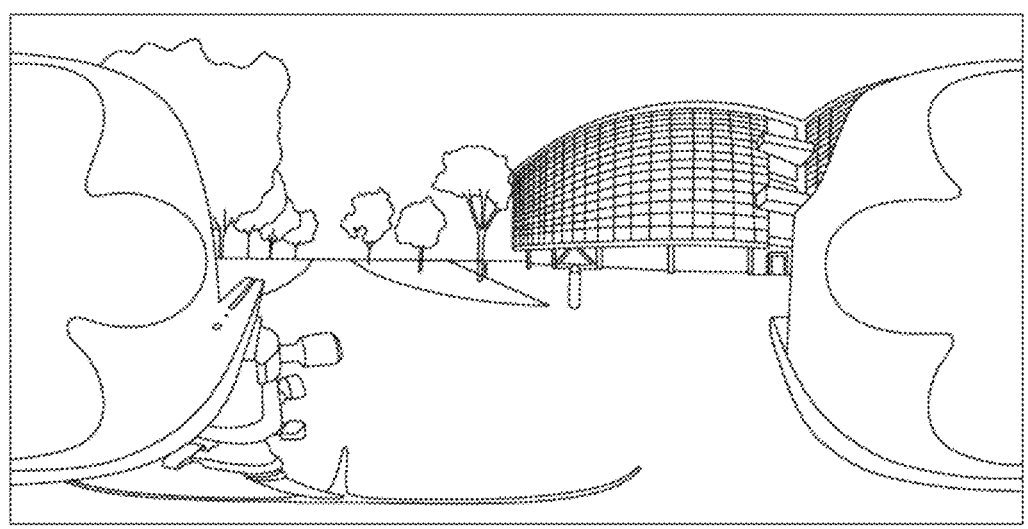
FIG. 2 is an illustration of the projection of the fisheye image.

Referring to FIGS. 1-2, omnidirectional cameras including wide-angle or ultra-wide angle (or fisheye) lens cameras form curved or circular images 100 of a scene captured by the camera. The image data of these circular or 360 degree images are often projected, such as with equirectangular projections (ERPs), to form a more practical 2D representation or image 200 that is capture device independent, easier to understand, and often used for further image processing or analysis. For example, existing omnidirectional image formats are very convenient for representing artificial content that has been generated by computer graphics methods that perform the projection. These systems provide immersive viewer experiences with 360° content, requiring image data representations that allow efficient creation, storage, streaming, and processing of such content, making it possible to produce the required final input for a user's display. Similar systems exist that instead of artificially generated content, utilize real life captured omnidirectional images. Herein, the term omnidirectional refers to any imaging that provides image information in a large number of directions, often causing a viewpoint shift as described herein, and is not necessarily a 360 degree image.

Converting captured omnidirectional images to standard projection formats such as equirectangular projection (ERP) or a cube map removes the dependence on the capture device and allows developing algorithms and hardware that do not have to be tailored to a particular camera type and can thus be more widely used.

Many of these conventional projected representations (or images) are generated by assuming the captured images are based on central projections when the system uses images captured from a wide angle or fisheye lens camera, and it is assumed that a single viewpoint is being presented. A central projection assumes a single viewpoint exists through which all the rays forming the image are passing.

However, in actual practice, wide angle and fisheye lenses that are commonly used for capturing real world omnidirectional content are non-central. They do not have a single viewpoint. An entrance pupil of a lens with an extremely large field of view tends to move. In this case the apparent viewpoint shifts along an optical axis of the camera and depends on the incident angle of the rays. Many wide angle lenses that are analyzed using ray tracing may reveal that the influence of non-central characteristics may be quite strong.

Figure 3:
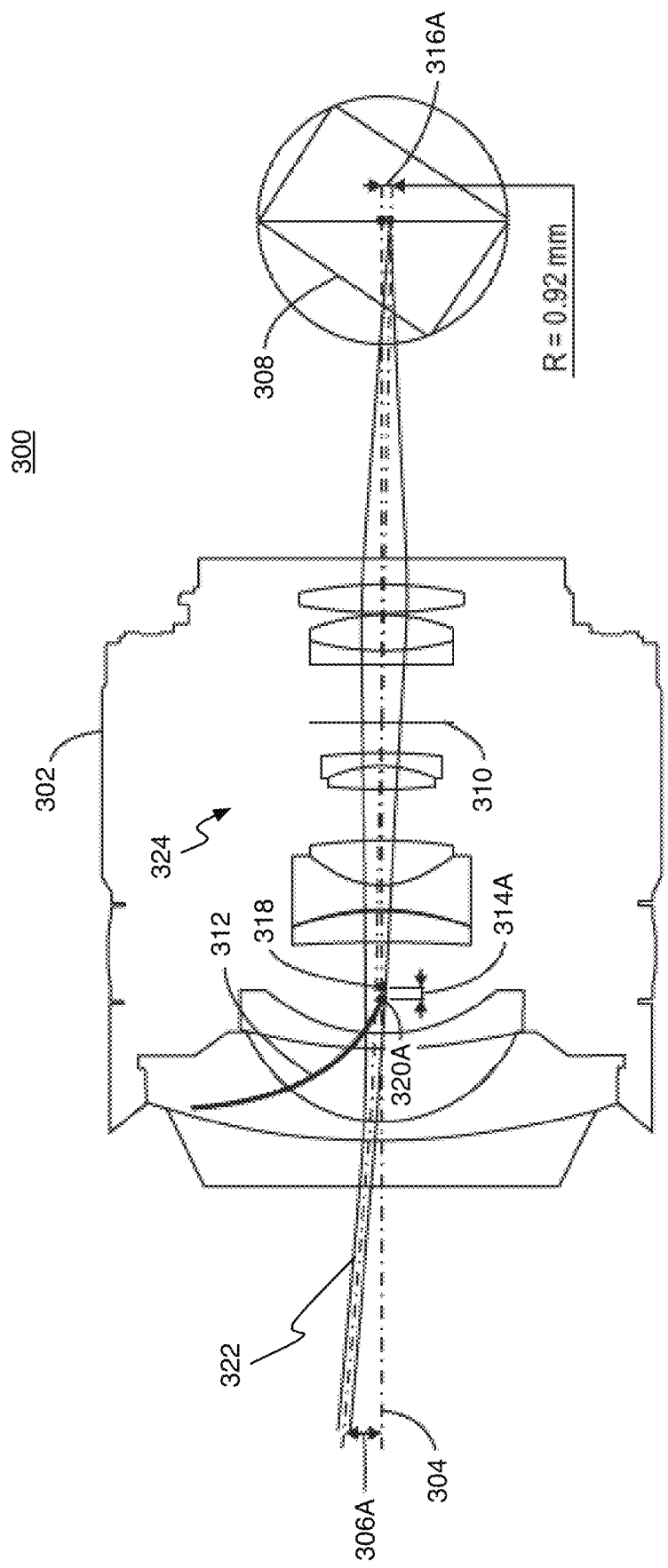
FIG. 3 is a diagram illustrating an example fisheye camera with ray tracing shown for a ray of five degrees.
Figure 4:
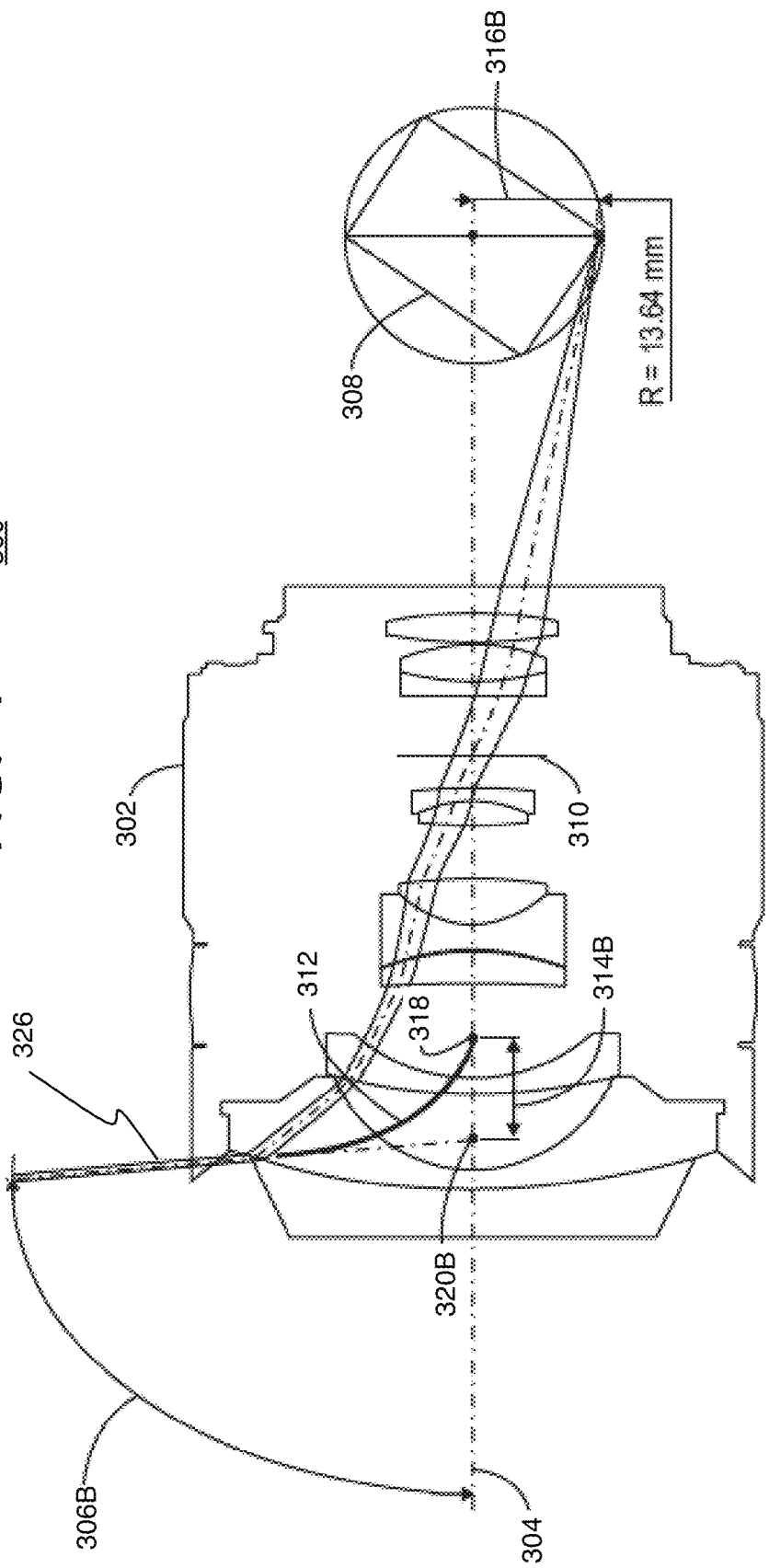
FIG. 4 is a diagram illustrating an example fisheye camera with ray tracing shown for a ray of 85 degrees.

Referring to FIGS. 3-4, an example fisheye camera 300 has ray tracing shown for a ray of five degrees. The example fisheye camera 300 may be part of a camera array. The fisheye camera 300 includes a fisheye lens 302 including a number of lens elements 324 all coaxial to an optical axis 304. For example, the lens elements may include various pieces of optical glass honed into spherical or aspherical shapes. A ray tracing of a ray 322 of incoming light through the fisheye lens 302 and to a sensor 308 has an entrance or incident angle 306A (also referred to as a theta angle) between the ray 322 and an optical axis 304 of the lens 302. In this example, the angle 306A is five degrees. The sensor 308 may have a number of different sizes and a 2D array of rows and columns of sensor pixels. Also, the fisheye lens 302 includes an adjustable diaphragm 310 that provides an aperture stop for the fisheye lens 302, where the aperture stop is set at an f-number, such as f/8 for example.

The camera 300 has an apparent viewpoint 318 for a zero incident angle. When the incident angle 306A changes to five degrees as shown, ray tracing shows that ray 322 has an apparent viewpoint 320A and that is moved axially along the optical axis from viewpoint 318. The distance between the viewpoint 318 and the viewpoint 320A is a viewpoint shift 314A. The viewpoints 318 and 320A are projection centers. A curved shift line 312 shows the actual positions of the entrance pupil centers as the incident angle is changing. This viewpoint shift also can be represented as a function of radial distance 316A between the center of the image where the optical axis intersects the sensor 308 and an image or object point in an ideal image plane perpendicular to the optical axis where the ray 322 intersects the sensor 308. The smaller the radial distance, the smaller the magnitude of the viewpoint shift. This can be used to generate viewpoint shift measures as explained in greater detail below.

The diagram of FIG. 3 is not intended to indicate that the example fisheye lens 300 is to include all of the components shown in FIG. 3. Rather, the example fisheye lens 300 can be implemented using fewer or additional components not illustrated in FIG. 3 (e.g., additional lens elements, sensors, values for angle theta, etc.). In addition, in some examples, the viewpoint shift may shift from left to right, rather than right to left, as the incident angle increases. For example, this may include ultra-wide-angle rectilinear lenses.

Referring to FIG. 4, example fisheye lens 300 is now shown with ray tracing of a ray 326 with an incident angle 306B of 85 degrees with respect to the optical axis 304. The example fisheye lens 300 includes similarly numbered elements described with respect to FIG. 3. Now, however, the ray 326 of the much larger incident angle 306B intersects the optical axis 304 at an entrance pupil 320B that has a much larger viewpoint shift 314B from the zero degree viewpoint 318. Equivalently, the radial distance 316B on the image sensor is much larger as well.

Figure 5:
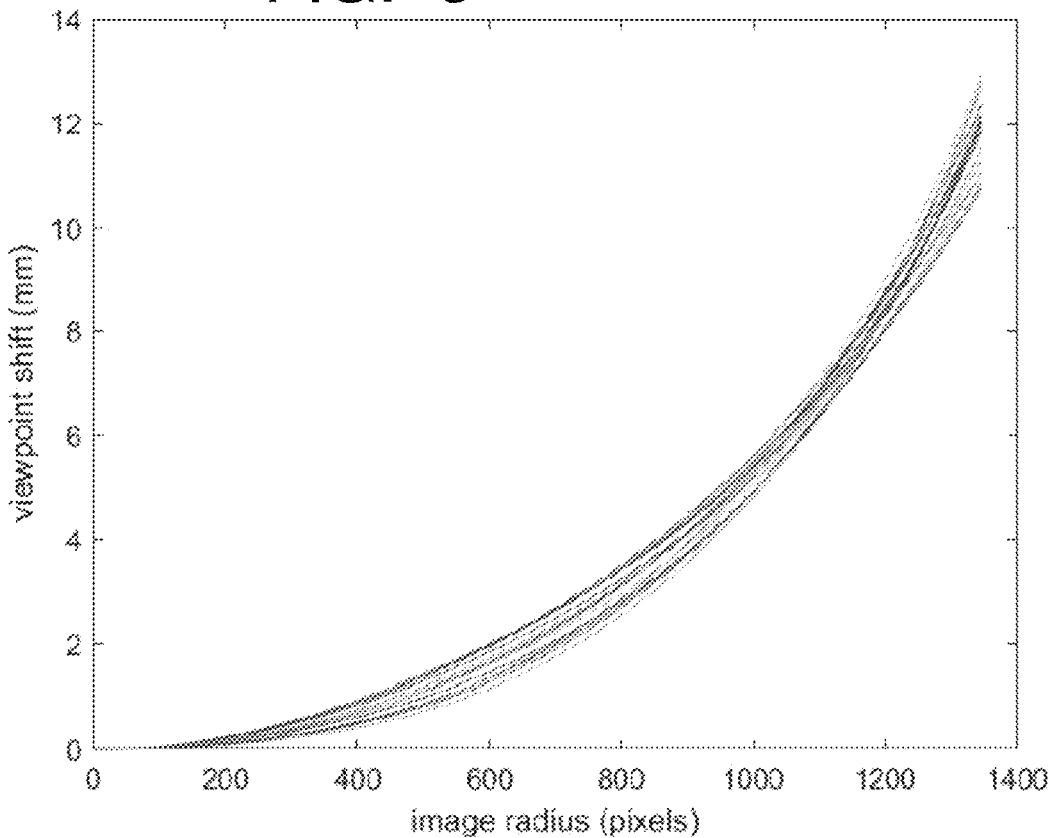
FIG. 5 is a graph showing viewpoint shift versus radius to an object point on an ideal image plane.

Referring to FIG. 5, a polynomial-based non-central calibration technique characterizes the dependence of the axial viewpoint shift as described above on the radial distance from the optical axis to an image point in the ideal image plane. A graph 500 shows an estimated viewpoint shift of sixteen fisheye cameras forming 360° camera array 1100 (FIG. 11) as the function of point radius within the image. A polynomial is produced for each of an estimated radial distortion and the viewpoint shift. The coefficient of these polynomials are found by iteratively minimizing a suitable cost function, producing a set of parameters that can be used for accurate processing of the captured images and for computer vision applications The viewpoint shifts 314A and 314B may be referred to as axial viewpoint shifts. This axial viewpoint shift may be particularly noticeable in wide angle lenses having a field of view close to or greater than 180 degrees. For example, rays coming from an angle closer to 90 degrees relative to the optical axis may result in a significant shift between (1) a real viewpoint where the chief ray with a particular incident angle intersects the optical axis and (2) an assumed viewpoint of a central projection model. This viewpoint shift also may be particularly significant in images of close objects that are about 1.5 m from the camera or closer. The viewpoint shift error is noticeable when using multiple images (stereo pair, or output of a multi-camera array, or a single moving camera, for example) and shows as errors in expected positions of points in a 3D scene or in another 2D image.

Accurately converting captured omnidirectional images that involve viewpoint shift to standard central projection based formats such as ERP or a cube map is complicated and requires highly accurate depth information which typically is not available at the stage when an image needs to be converted to device independent formats. Disparity and depth estimation algorithms often assume that the provided input already is in some device independent format such as ERP or a cube map. Even if the depth can be estimated, the obtained estimate may not be accurate enough. Also, the required mapping is complex, the transformation is computationally expensive, and the produced device independent images may suffer severe artifacts resulting from the need to fill in occlusions where the image information is not available.

Due to these complexities, the viewpoint shift is often ignored when converting captured images to the device independent formats. Many existing systems, such as OpenCV, Matlab, MPEG, and so forth to name a few examples, neglect viewpoint shift and treat omnidirectional images captured by wide angle and fisheye cameras with format algorithms that are based on central projections.

While neglecting the viewpoint shift may make computations much simpler, this may lead to large errors that severely limit performance of the system especially for objects near the camera. Capturing objects close to the camera is often necessary with the fisheye and wide angle lenses for the object to be large enough in the field of view of the camera. For example, in some camera arrays, the disparity (depth) estimation may start to break down for objects closer than 1.6 meters. In various examples, such viewpoint shift may result in errors in the magnitude of tens of pixels between the real and estimated image point position that may accordingly affect various computer vision applications. For example, a ray tracing analysis of a set of fisheye lenses indicated that a viewpoint shift between 0° and 90° incident angle can be about 1 cm or more. In the case of an object placed 0.5 m from the camera at a 90° angle, neglecting a one centimeter viewpoint shift results in more than 1° error in the assumed ray direction. With a large resolution camera, this viewpoint shift may translate to an error in order of tens of pixels. In another example, in 360° camera arrays that use very high resolution sensors providing angular resolution of about 35 pixels per degree, an error of more than 40 pixels may occur with a similar viewpoint shift. With such inaccuracies, computer vision computations can result in significant errors with stereo camera depth generation including in localization, camera calibration, novel view interpolation, or depth measurement.

To attempt to avoid these errors, several non-central projection camera calibration models have been developed that can represent wide angle and fisheye cameras with a relatively higher degree of accuracy. Central projection-based calibration does not account for the viewpoint shift and is therefore less accurate. Camera system design specifications may not describe real system behavior with sufficient precision due to manufacturing tolerances and other factors. Thus, camera calibration is typically required. It may involve the use of either images captured with the particular camera or some other kind of measurements involving the actual camera to obtain accurate camera characterization. In order to correct for various types of lens distortion, lenses may be modeled, and the resulting model used to calibrate the particular lens. It follows that such modeling should be able to provide highly accurate characterization of the image capture to be used in computational imaging and 3D computer vision applications.

Specifically, camera calibration often must be performed beforehand in order to subsequently perform omnidirectional projection for computer vision or imaging applications that map points in captured two-dimensional (2D) images to light rays or points in a three-dimensional (3D) world or vice versa with a high degree of accuracy. Calibration models and algorithms used for the calibration of regular cameras are generally unsuitable for wide-angle cameras such as fisheye cameras. For example, such models may not be able to handle the field of view that is close to or exceeds 180°. In particular, such calibration models may represent a scene as a plane or use the concept of a planar undistorted image that covers the whole FOV, which is not possible when the FOV is close to or exceeds 180 degrees due to the central projection assumption. Omnidirectional camera calibration thus needs to use special models and these models can be made more accurate by including viewpoint shift characterization.

Intrinsic calibration refers to calibration of parameters that are intrinsic to the camera itself, such as parameters related to sensor geometry and alignment, lens distortion, viewpoint shift, and so forth. Most intrinsic calibration methods rely on some parametric model of a camera (for example describing the radial distortion and viewpoint shift as polynomials, in which case the parameters are the polynomial coefficients). The intrinsic calibration methods often use captured images of some known calibration target (e.g., a checkerboard) and perform non-linear optimization to find parameters that provide the best match between points projected by corresponding the given parameter values with real observed points in the captured images.

A different calibration technique does not rely on a parametric model, but instead uses 3D scene model or structured light to produce a 2D look up table for the lens geometric distortion and viewpoint shift.

Often the viewpoint shift amount is computed as a function of the incident angle. In other calibration methods, it is expressed as the function of the image point radial distance. While the latter representation is preferred here, as it leads to algorithms in operation 714 that are more computationally efficient, the more common incident angle based viewpoint shift calibration can also be used.

To resolve these issues and provide device independent omnidirectional image representation which can be widely used that is more accurate than standard central projection based representations which ignore the viewpoint shift, an omnidirectional image format is created that supports separating (or isolating) recording of the viewpoint shift information, and attaching it to the image data, for use by many different types of devices and applications. This omnidirectional image data representation is convenient, allows representing omnidirectional images captured with fisheye and wide angle cameras with high degree of accuracy, and is very easy to produce compared to the accurately corrected central projections, which require obtaining accurate depth information, complex mappings, and filling in occlusions. In particular, the direction of the viewpoint shift and its magnitude for each image location within the reprojected omnidirectional image may be computed, maintained, and transmitted as a separate device-independent channel and metadata, respectively, to provide this viewpoint shift information to image processing and computer vision applications that can use the viewpoint shift information as needed to increase the computation accuracy and improve the performance of the computational imaging or computer vision systems. The produced viewpoint shift information may be stored in memory to be used as needed, and by one example form, the viewpoint shift magnitudes may be in the form of a viewpoint shift map where image data values are provided at each pixel location to represent a viewpoint shift magnitude value on an available scale of the values.

Thus, the presently disclosed method and system augment omnidirectional images with an extra channel that has the information about the magnitude of the viewpoint shift. For one example, the direction of the viewpoint shift can be stored within image metadata for transmission between devices or when compatible with metadata on the same device.

The viewpoint magnitude and direction can be determined by using any of the non-central projection techniques mentioned or other known algorithms. By one form, the non-central projection calibration technique is used that calculates the axial viewpoint shift as a function of the radial distance from the principal point in a fisheye image rather than a function of the incident angle and then such calibration is used to calculate the magnitude of the viewpoint shift for each pixel in a device independent image representation.

Converting a captured wide angle or fisheye image to the proposed device independent format is straightforward due to using a similar simple depth-independent mapping to convert the image data to a device independent format as when the viewpoint shift is ignored, and attaching the information about the viewpoint shift in a separate image channel and in image metadata. The particular algorithm depends on the used calibration type used and image data channel format The disclosed method thus also is fully backward compatible with the currently used representations or projection images. Specifically, the present method may be used as a direct extension of ERP and other currently used omnidirectional image representations based on central projections. The existing standards and systems can be adapted to allow this representation. All existing algorithms using standard omnidirectional data formats can be either improved by incorporating the viewpoint shift magnitude information when received and considering rays in 3D that originate at points other than a single viewpoint, or the existing algorithms can be applied to the data in the proposed format as is by using the usual image channels and merely ignoring the viewpoint shift magnitude channel information, whichever is more appropriate for a given application In addition, the viewpoint shift information or map is highly compressible because the magnitude of the viewpoint shift changes slowly and smoothly (or gradually) with the incident angle direction and, consequently, with the pixel position in the omnidirectional image representation. Also, most of the time, the viewpoint shift magnitudes are likely to change smoothly and slowly over time as the camera moves in a reference coordinate system, or the viewpoint shift magnitudes may even remain constant if the camera is static with respect to the produced device independent image orientation. Thus, the disclosed system can significantly reduce the size of the overhead needed to store and/or transmit viewpoint shift information.

The omnidirectional image representation disclosed herein can help to improve performance of any systems using wide angle or fisheye cameras, including the systems used for automotive applications, depth cameras, security systems, medical scopes, and so forth.

Figure 6:
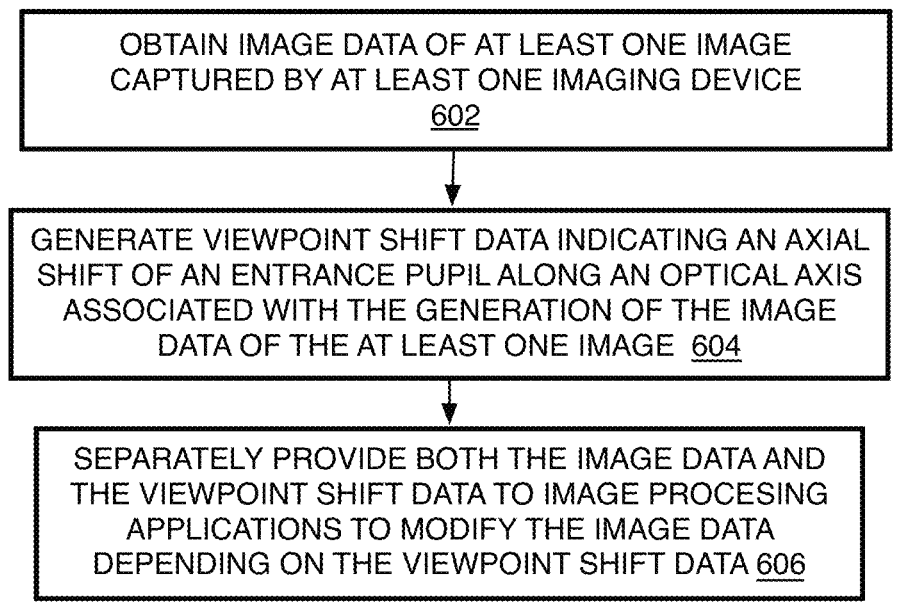
FIG. 6 is a flow chart of a method of image processing of omnidirectional images with a viewpoint shift according to at least one of the implementations herein.

Referring to FIG. 6, an example process 600 of image processing of omnidirectional images with a viewpoint shift described herein is arranged in accordance with at least some implementations of the present disclosure. In the illustrated implementation, process 600 may include one or more operations, functions or actions as illustrated by one or more of operations 602 to 606 numbered evenly. By way of non-limiting example, process 600 may be described herein with reference to image processing systems 1200 (FIG. 12) or 1300 (FIG. 13) described herein and where relevant.

Process 600 may include "obtain image data of at least one image captured by at least one imaging device" 602. This may involve obtaining pre-processed omnidirectional image data ready for projection to a 2D image, and at least forming 3D points of an ERP projection by one example.

Process 600 may include "generate viewpoint shift data indicating an axial shift of an entrance pupil along an optical axis associated with the generation of the image data of the at least one image" 604. This may involve generating viewpoint shift magnitudes, and by one example, by using non-central projection calibration techniques that generate the viewpoint shift magnitudes. By one form, the techniques are polynomial-based techniques, and the magnitudes are generated without measuring incident angles of light into the camera lenses. By one form, the magnitudes initially may be real-world lengths Alternatively, the viewpoint shift magnitude can be computed using the results of analyzing the lens design. Ray tracing can be used to produce the mappings between the incident angle or image point radial distance and the viewpoint shift amount.

The viewpoint shift data also may include a viewpoint shift direction for each or individual image, which is the direction of the optical axis of the camera that has captured the image. This information may be extracted from a rotation matrix that transforms coordinates from a camera orientation to a selected view orientation. Such a 3×3 rotation matrix can be provided directly, or using a rotation parameterization by Euler angles, by a quaternion, or by other means. Alternatively, the viewpoint shift direction can be provided directly, either as a 3D vector in some known reference coordinate system, or as longitudinal and latitude angles of the shift direction, or as the pixel position corresponding to that direction in the projected device independent image.

Process 600 may include "separately provide both the image data and the viewpoint shift data to image processing applications to modify the image data depending on the viewpoint shift data" 606. Separate here refers to the viewpoint shift data, including the viewpoint shift magnitude or direction or both, being at least distinguishable from the image data of the same image and does not otherwise limit the format for having the viewpoint shift data accompany the image data. By one form, the magnitudes of the viewpoint shift data is provided as a viewpoint shift channel separate from one or more channels providing chroma and luma, RGB image data, or image data represented in another color space. The magnitudes may form a viewpoint shift map where each of individual pixels in the map has a viewpoint shift magnitude value. This value may be scaled from initial magnitude values and to typical pixel values of a certain bit-depth, such as 0-255 for an 8-bit depth by one example. The viewpoint shift data can then be used by applications to refine 3D point position estimates or 2D projected pixel locations on a projected image. More details are provided below.

Referring to FIG. 7, an example process 700 of image processing of omnidirectional images with a viewpoint shift described herein is arranged in accordance with at least some implementations of the present disclosure. In the illustrated implementation, process 700 may include one or more operations, functions or actions as illustrated by one or more of operations 702 to 730 generally numbered evenly. By way of non-limiting example, process 700 will be described herein with reference to the image processing systems 1200 (FIG. 12) or 1300 (FIG. 13) described herein and where relevant.

Process 700 may include "receive image data of at least one omnidirectional image" 702. By one form, an image processing system receives image data of images captured from a camera with an omnidirectional lens (or set of lenses) such as a fisheye lens or a wide angle lens. The specification of the lens otherwise is not limited as long as an axial viewpoint shift is formed. When such image data is obtained directly from one or more camera sensors, the image data may be in an RGB, YUV, or other color scheme usually as a 2D array of image sensor data, and may be patterned by a filter such as a Bayer filter.

Process 700 may include "apply pre-processing" 704. When raw image data is obtained directly form a camera or other memory or buffer, pre-processing may be applied such as de-mosaicing, noise-reduction, and so forth, at least sufficient to apply viewpoint shift correction and generate projection images (or representations).

Process 700 may include "obtain calibration parameters or specification" 706. As one alternative, in order to be able to perform projections from a 2D array of sensor data to other data formats and to quantify viewpoint shift, ideal camera design specifications can be analyzed to obtain intrinsic and/or extrinsic. Otherwise, calibration may be performed beforehand that generates the intrinsic and extrinsic parameters. Intrinsic parameters, include information about geometric distortion, viewpoint shift, and other properties of a particular camera. Extrinsic parameters refers to the rotation and translation of the camera with respect to some fixed frame of reference, or, in the case of multiple cameras, it may include parameters that characterize their mutual position and orientation. Alternatively, gyro sensors can be used to track the position of the camera or other means of camera tracking can be employed to find the extrinsic parameters. Calibration or design analysis is typically performed beforehand. Step 710 typically involves reading the results of calibration or design analysis from memory or receiving them via transmission.

Process 700 may include "obtain image view parameters or specification" 708, and specifically specifications for the desired projected view that includes information such as view resolution, orientation, and so forth. These may be pre-programmed or received from an application which uses the produced images.

Process 700 may include "generate projection image" 710. One of the standard formats for representing omnidirectional images is the equirectangular projection (ERP). It is based on parameterizing a unit sphere by the longitude and latitude angle. A 360°×180° ERP is the most commonly used format for omnidirectional image representation and may be used here. Alternatively, other formats may be used. Example alternative ERP formats include selected portions of an ERP image, especially forward facing 180°×180° hemisphere images, and various projections that use various polyhedra instead of a sphere, most commonly a cube.

In this example, process 700 may include "generate ERP representation" 712. The input to software that produces ERPs from fisheye captured images includes (1) the fisheye captured image itself, (2) both the intrinsic and extrinsic parameter camera calibration (or the specifications thereof), and (3) specifications for the desired projected view that includes information such as view resolution, view orientation (which is at least the rotational positioning of the camera), and so forth. It should be noted that a fisheye camera and lens is mainly referred to for this example, but that the methods herein will apply to any wide angle lens and camera that causes an axial viewpoint shift as described herein.

To produce an ERP image from a fisheye image, every pixel in the captured image can be considered to have a ray of points in 3D space that is projected by the lens to that pixel. Thus, a projection unit 1212 of system 1200 (FIG. 12 below) may use the ERP image specification to identify a ray in 3D space that is projected to each pixel in the projection image. The omnidirectional or fisheye camera parameters are then used to determine which pixel in the fisheye image, when the viewpoint shift is ignored, corresponds to the same ray. The system then assigns the same value of the fisheye pixel to the corresponding ERP image pixel. A set of 3D coordinates (X, Y, Z) are typically the coordinates of a 3D point that represents the ray. These 3D coordinates are often used as an intermediate result in the process of producing the ERP image with 2D pixel points. This process is also referred to as image warping, undistortion, resampling, and so forth.

Once the 3D coordinates are generated, the 2D ERP image or representation coordinates (x,y) can be generated as follows. In this example of the 3D coordinate system, the X axis extends to the right, the Y axis extends downwardly, and the Z axis extends forward where Z is the direction of, and parallel to, the optical axis, and X and Y are the coordinates in a spherical image formed by the camera. The 2D image pixel coordinates (x,y) may start with (1,1) in the upper left corner, where x is the horizontal coordinate, left to right, and y is the vertical coordinate, top to bottom. This coordinate system is compatible with that commonly used for modeling optical systems as well as known tools, such as Matlab Computer Vision System Toolbox, for example.

A point (X, Y, Z) in 3D space, expressed in the local coordinate system of the 360° view or spherical image as mentioned, respecting its orientation and viewpoint location, lies on a ray with longitude and latitude:

$$\text{Latitude Angle } \varphi = a\tan2(X, Z), \quad (1)$$

$$\text{Longitude Angle } \theta = a\sin(Y/\sqrt{X^2+Y^2+Z^2}) \quad (2)$$

It should be noted that $\theta$ here is not the theta incident angle 306A and 306B mentioned above.

A 360°×180° ERP image of size 2N×N has resolution N/180 pixels per degree, and the ray ($\varphi$, 0) is projected to the image point (x,y) where N is the number of pixels forming the height of the ERP image (ERP resolution). With the ERP resolution and angles of the ray ($\varphi$, 0), it can be determined that the corresponding 2D coordinates (x,y) on the ERP image is:

$$x = \varphi \frac{N}{\pi} + (2N+1)/2, \quad (3)$$

$$y = \theta \frac{N}{\pi} + (N+1)/2. \quad (4)$$

Next, process 700 may include "obtain viewpoint shifts" 714. In detail, since ERP and other central projections each have an image pixel corresponding to a light ray coming from a certain direction, and to represent light rays coming from all directions, it is convenient to adopt a similar parameterization as in the case of central projections. In the present methods, the disclosed system also can generate viewpoint shift information (i.e. the position of ray origin) for each pixel, and by one example, the disclosed system can generate at least a viewpoint shift magnitude for each individual pixel of a projected image, or some subset of them allowing to approximate the value for each pixel later on. It is known that an image can be augmented by adding an extra channel carrying depth information. Here, instead, or in addition to that, the image data is augmented with an extra channel that carries information about the magnitude of the viewpoint shift for each individual pixel. Also, the viewpoint shift direction for the image is provided as well, and as described below.

Viewpoint Shift Magnitude

Operation 714 may include "obtain viewpoint shift magnitude" 716. The disclosed method augments a standard omnidirectional image representation such as ERP with an extra channel with at least the magnitude (or amount) of viewpoint shift s(x,y). In one example, camera specifications may provide the necessary data needed for computing the values of viewpoint shift magnitude and direction. By other options used here, the viewpoint shift magnitudes or values may be computed using the results of parameter calibration based on non-central projection. While avoided in the example below, and whether in camera specifications or by parametric calibration, the measure of the viewpoint shifts could be obtained relative to incident angle measurement. When based on incident angle in this case, and as mentioned above, this still is not very efficient and characterization relative to image point radial distance is preferred. For the look up table technique, the viewpoint shift values may be obtained by resampling the produced viewpoint shift 2D look up table in exactly the same manner as when the captured image is resampled to produce an ERP image.

Referring again to FIGS. 3-4 again, operation 716 may include "use non-central-based calibration" 717. Thus, by the non-central projection calibration technique mentioned, a viewpoint shift polynomial may be generated as a function of the radial distance in an ideal image plane. This representation may help avoid the need to compute incident angles thereby significantly reducing the computational load. The radial distance of a corresponding point in the ideal image plane of fisheye camera needs to be computed for each pixel when reprojecting the captured omnidirectional image to a standard device independent format. It is thus generally more efficient to reuse this already computed information than to solve for the corresponding incident angle. The details for one instance are provided in U.S. patent application Ser. No. 16/886,512 filed May 28, 2020, published as U.S. Patent Publication No. 2020/0294269, on Sep. 17, 2020, which is incorporated herein for all purposes. By one form, the viewpoint shift magnitude values or amounts are provided in a format that is, or is convertible to, values that can be used to generate a viewpoint shift map (FIG. 9), where each pixel location in the map has a viewpoint shift value or value that represents the viewpoint shift magnitude. As discussed below, this may include values limited by channel bit depth or other limitations. In this case, the magnitudes may be scaled to fit typical 8-bit pixel image values such as 0-255 as discussed below. The bit-depth may be the same as that of the other channels for the same image.

View Point Shift Direction

Operation 714 also may include "obtain viewpoint shift direction" 718. The shift direction is the same for all of the image points in a single image, which is along the direction of the optical axis of the camera as explained above. Thus, the direction of the shift can be stored within metadata associated with the image in a form of a single vector or a rotation matrix from which it can be extracted, or a parameterization of thereof.

One possible representation of viewpoint shift direction involves recording the pixel coordinates ($x_0$, $y_0$) of the point in the device independent image that corresponds to the same direction in 3D space. In more detail, the viewpoint shift direction is the direction from the camera position, or center of a projection sphere of associated ERP image, in the direction of camera optical axis, and it can be specified by providing the coordinates of a point in the ERP image corresponding to the point on the projection sphere where the camera optical axis intersects this sphere.

By one alternative, the viewpoint shift direction may be provided by determining the camera orientation with regard to the ERP view orientation, using a 3×3 rotation matrix as described below, three Euler angles, a quaternion, or another parameterization of a rotation as desired. In the example forms here, to determine the viewpoint shift direction, process 700 optionally may include "obtain image rotation matrix" 720. In detail, to compute the direction of the viewpoint shift, it is necessary to know the mutual orientation of the camera and view. Let the rotation matrix:

$$R = \begin{bmatrix} r_{11} & r_{12} & r_{13} \\ r_{21} & r_{22} & r_{23} \\ r_{31} & r_{32} & r_{33} \end{bmatrix} \quad (5)$$

be the rotation of the camera with regard to a chosen view orientation. The view orientation is a matter of choice in an image processing application that uses the ERP image data or representation and viewpoint shift data. The view orientation can be specified relative to the camera orientation or relative to some other frame of reference. So, for example, the view orientation can be the same as the camera orientation, in which case R=I (3×3 identity matrix). If the view orientation is specified with regard to some other frame of reference, then the camera orientation with regard to the same frame of reference should be determined. This information is typically obtained by system calibration since the actual camera position tends to differ from the ideal design due to manufacturing tolerances.

In more detail, calibrating the camera position is a standard 3D computer vision problem for which many methods exist. When the chosen view orientation is represented by a 3×3 rotation matrix Rv and the camera orientation is represented by a 3×3 rotation matrix $R_C$, the matrix R representing the mutual orientation (or transform or conversion from one to the other) as:

$$R = R_V^T R_C \qquad (6)$$

The 3×3 rotation matrix $R_C$ can be obtained as part of camera extrinsic parameters (or position characterization). Camera rotation can be expressed in different ways, and the 3×3 rotation matrix is one of them. The rotation matrix is typically used for transform computations from one coordinate system to another. However, the same information can be expressed more concisely by three angles (such as camera pitch, yaw, and roll).

Alternatively, instead of a 3D three-element rotation vector, the viewpoint shift direction can be characterized by two angles (latitude and longitude) as follows:

$$\varphi_0 = a\tan 2(r_{13}, r_{33}) \qquad (7)$$

$$\theta_0 = a\sin(r_{23}) \qquad (8)$$

Otherwise, the coordinates of the equivalent ERP point $(x_0, y_0)$ that corresponds to the viewpoint shift direction can be computed using the above angles and formulas $$x_0 = \frac{N}{\pi}\varphi_0 + \frac{2N+1}{2} \qquad (9)$$

$$y_0 = \frac{N}{\pi}\theta_0 + \frac{N+1}{2} \qquad (10)$$

While expressing the viewpoint shift direction as coordinates of the point $(x_0, y_0)$ is just one possibility, this representation eliminates redundancy; does not require the knowledge of an external frame of reference for camera and view orientation; and reduces the risk of some common problems such as errors stemming from the use of different coordinate systems and/or the use of row vectors instead of column vectors which causes $R^T$ to be mistaken for R, and so forth.

When the viewpoint shift data is to be transmitted, whether locally or to a remote device, process 700 next may include "place magnitudes in viewpoint shift channel (VSC)" 722. This involves providing the viewpoint shift amount as a separate image channel and by one form, in a format that is, or is convertible to, values of a viewpoint shift map. In some forms, similar to color channels or chroma and/or luma (or luminance or brightness) channels of an image, the viewpoint shift channel is formed in a pixel raster of viewpoint shift magnitude values mentioned above (or other format or representative of the viewpoint shift magnitude) which are scaled and quantized so as they can be represented in whatever bit depth is being used, such as 0-255 8-bit scale for example, but other bit depths are possible as well. Also as mentioned, the image can include in addition to the color channels (or luma and chroma channels) and VSC also other channels, such as depth data channel and/or an alpha channel used for transparency values.

Referring to FIGS. 8-9, an example ERP image 800 output from a fisheye camera is shown according to the implementations herein with omnidirectional format and showing the color channels. A corresponding example image 900 is a viewpoint shift map as described above and where the lighter the pixel location, the larger the viewpoint shift magnitude on a set scale such as 0 to 255 or any other desired scale. The solid black area is out of the field of view of the fisheye lens, where the real amount of viewpoint shift is not defined and a value 0 has been assigned to the corresponding pixels in the map As mentioned, the system may scale the initial viewpoint shift values to provide a fixed point representation, which also can be performed in many different ways including linear scaling but others may be used as well. Many of the scaling techniques used for the other image channels (chroma for example). Also similarly as chroma channels in YUV or YCbCr color spaces, which may by downsampled to reduce bandwidth, the VSC can be downsampled. The viewpoint shift amount map will often have gradual changes from pixel to pixel so that the map can be downsampled even by larger factors than two, as used in color schemes YUV420 or YUV422. By one example, the downsampling factor can be eight, which can provide one viewpoint shift amount sample per 8×8 block of pixels that is easily compatible with image compression algorithms. Also as YUV, RGB or any other multi-channel images, an image that has a viewpoint shift channel may be transmitted and/or stored plane by plane or interlaced. It should be noted that the chroma/luminance channels also can be RGB or other color space channels.

Also when transmitting the viewpoint shift data, process 700 may include "place viewpoint shift direction in metadata" 724. As mentioned above, the viewpoint shift direction can be expressed in many different ways, for example as the coordinates of $(x_0, y_0)$ of the point in the ERP image corresponding to viewpoint shift direction. Here it is a single pair of image point coordinates numbers, same for the entire image. A single 3D vector or single set of angles may be provided instead as mentioned above. Different applications may have different ways of receiving and tracking the viewpoint shift direction. For example, for still images, the viewpoint shift direction can be embedded in an image file header as metadata together with various other information about the image such as its resolution, time of capture, and so forth. In case of a video sequence, the viewpoint shift direction may be either the same or different for each video frame and could be stored within video container either within a header or within the essence together with video and sound. Alternatively, the viewpoint shift direction can be stored and or transmitted separately from the image data.

Process 700 next may include "place image and viewpoint shift data in transmission channels" 726, and this involves placing the image data and viewpoint shift in order or channel format if not performed already, and whether the image and viewpoint shift data is to be compressed and transmitted to a remoted device or the image and viewpoint shift data is being stored for use by another application the same device. It should be noted that the viewpoint shift magnitude data or direction data may be transmitted alone without the other when desired, or may be sent in different transmissions even though the data is for the same image.

Then for either storage or transmission, process 700 may include "compress data for transmission bitstream" 728. Here, the viewpoint shift magnitude channel (VSC) and other image channels are compressed. The channels with the metadata are then placed together in a bitstream for transmission to remote devices.

As to the compression and as mentioned above, the magnitudes of the viewpoint shift often changes slowly and smoothly (or in other words, gradually) with the incident angle direction and, consequently, with the pixel position in the omnidirectional image representation. Also, most often, the magnitudes are likely to change smoothly and slowly over time as the camera moves in a reference coordinate system, or the magnitudes may even remain constant if the camera is static. The viewpoint shift information or data is thus highly compressible, making it possible to significantly reduce the size of the overhead needed to store and/or transmit this viewpoint shift data.

Otherwise, process 700 optionally may include "store image data channel(s) and accompanying separate VSC and direction metadata" 730. In this case, whether or not the viewpoint shift data also is being transmitted to a remote device, the viewpoint shift data may be stored with the image data on the current or local device for further use on the current device. The format of the viewpoint shift magnitudes and directions for storage may be the same or similar to that as described above.

Figure 7A:
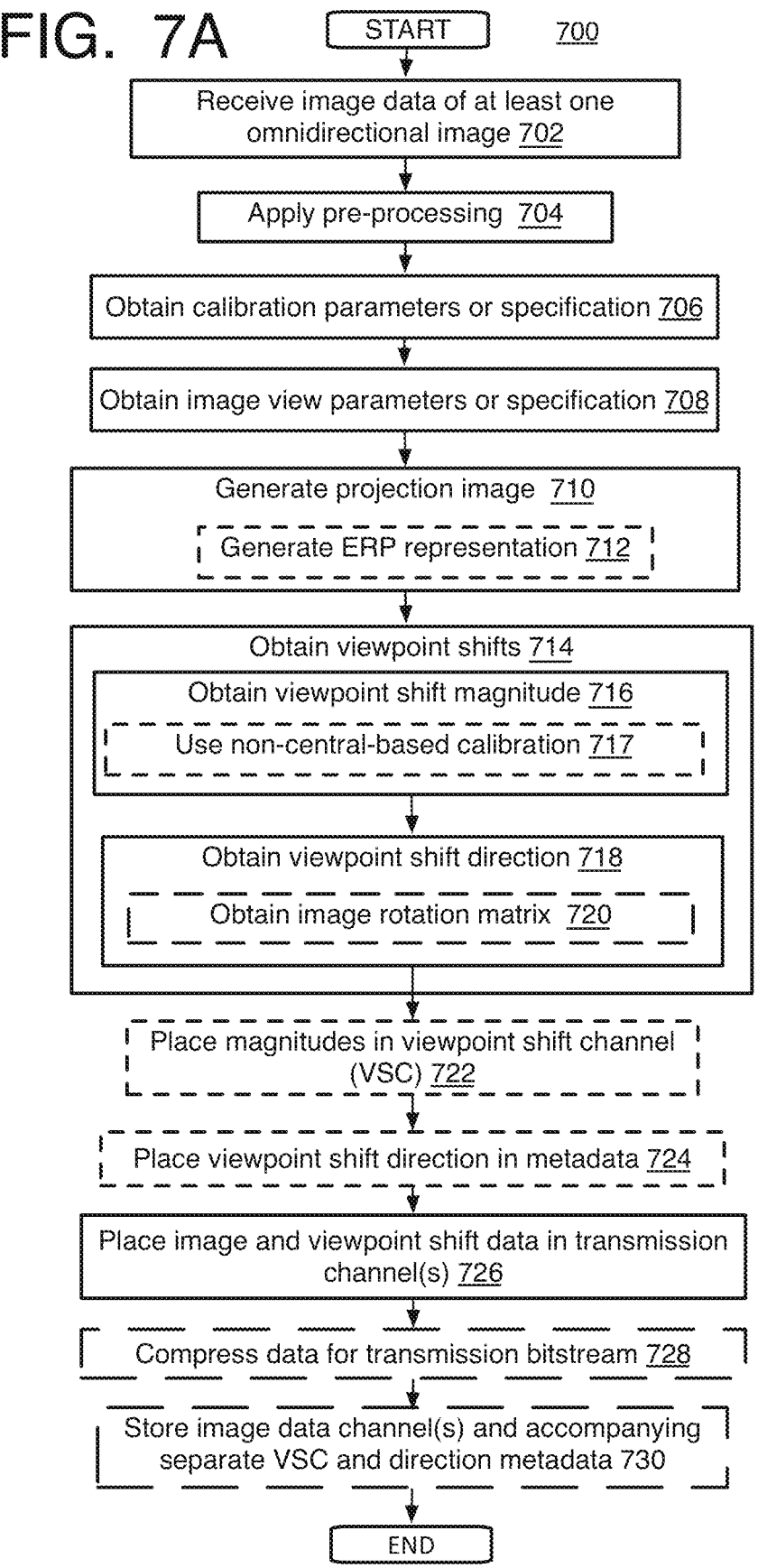
FIG. 7A is a detailed flow chart of a method of image processing of omnidirectional images with a viewpoint shift according to at least one of the implementations herein.
Figure 7B:
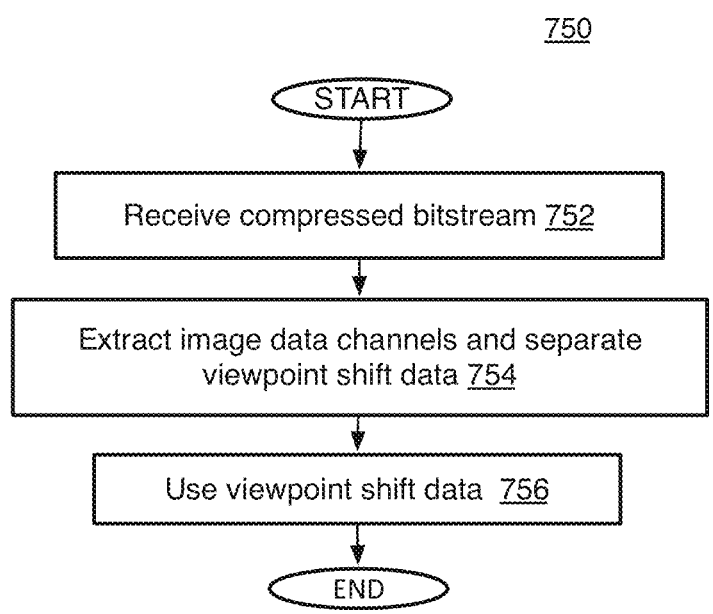
FIG. 7B is yet another detailed flow chart of a method of image processing of omnidirectional images with a viewpoint shift according to at least one of the implementations herein.
Figure 10:
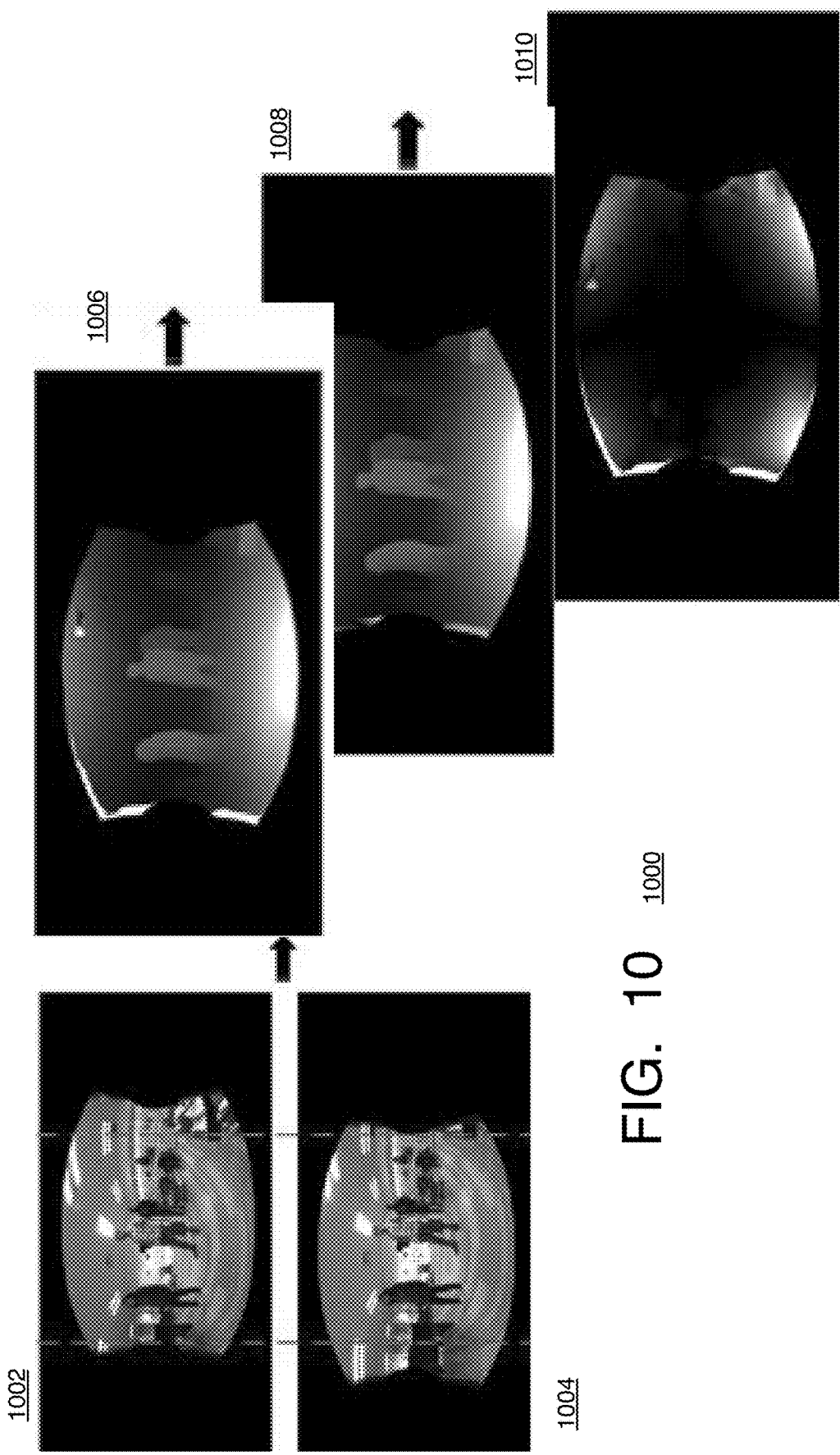
FIG. 10 is a flow sequence of images showing processing of projected images with viewpoint shift correction according to at least one of the implementations herein.

Referring now to FIG. 7B, a process 750 of image processing of omnidirectional images with a viewpoint shift described herein is arranged in accordance with at least some implementations of the present disclosure. In the illustrated implementation, process 750 may include one or more operations, functions or actions as illustrated by one or more of operations 752 to 756 generally numbered evenly. By way of non-limiting example, process 750 will be described herein with reference to the image processing systems 1200 (FIG. 12) or 1300 (FIG. 13) described herein and where relevant.

Process 750 may include "receive compressed bitstream" 752, and this may include receiving compressed data of image data channels such as RGB or YUV channels for example as well as a compressed viewpoint shift channel that has data for a viewpoint shift map as well as viewpoint shift direction data as metadata, overhead data, image or sequence header data, and so forth. It will be understood that more than one bitstream could be received and/or one or more of the bitstreams could be non-compressed.

Process 750 may include "extract image data channels and separate viewpoint shift data" 754. This involves obtaining the different types of data from the bitstream and then decoding and reconstructing the image data and viewpoint shift magnitudes as well as the viewpoint shift directions when compressed.

Process 750 may include "use viewpoint shift data" 756. Here, the viewpoint shift data, in the form of a viewpoint shift map when provided, as well as the accompanying viewpoint shift direction may be used to generate depth data, 3D models, or 3D reconstructions, often with the use of multiple images, or more accurate image data that is then used for further image data analysis or modification. The viewpoint shift data or representations allow for easy identification of a ray in 3D, and in turn, the 2D point on the ERP image for example.

Specifically, it will be appreciated that this format includes all of the necessary information that is needed to find the position in a 2D image to which a particular point in 3D is projected. In detail, an example application shows how to adjust the 3D (X,Y,Z) coordinates to account for viewpoint shift by using the viewpoint shift magnitude and direction that may be obtained from the viewpoint channel and metadata, respectively, as described above. Also as described above, a preliminary (x, y) position on the ERP image may be determined initially per equations (1)-(4) above. Thereafter, a simple iterative process can be used to determine viewpoint shift-based point coordinates.

In detail, the estimated position (x, y) allows for determining an approximate value of the viewpoint shift amount s(x, y) for the estimated point, and this value is then used to obtain a refined estimate of the projected location (x, y), using the equations (1)-(4) above where X, Y, and Z are replaced by $\tilde{X}$, $\tilde{Y}$, and $\tilde{Z}$, respectively, where:

$$\tilde{X}=X-s(x,y)\sin(\varphi_0)\cos(\theta_0), \quad (11)$$

$$\tilde{Y}=Y-s(x,y)\sin(\theta_0), \quad (12)$$

$$\tilde{Z}=Z-s(x,y)\cos(\varphi_0)\cos(\theta_0), \quad (13)$$

where $\varphi_0$ and $\theta_0$ are viewpoint shift direction angles, described by equations (10)-(11).

This process is then repeated until the desired accuracy is achieved. Once the 3D point is generated with accurate adjustment for the viewpoint shift, the 3D ($\tilde{X}$, $\tilde{Y}$, $\tilde{Z}$) coordinates then can be easily converted to 2D points on an ERP image for example and as already described above.

It also will be appreciated that appreciated that this format includes all of the necessary information that is needed to find the ray in a 3D space to which a particular point in 2D image corresponds. The obtained ray is more accurate than the one obtained without incorporating the information about the viewpoint shift.

For an ERP image, the pixel at the position (x, y) stores information about the color or luminance along a ray with longitude and latitude angles:

$$\varphi = \frac{\pi}{N}\left(x - \frac{2N+1}{2}\right) \quad (14)$$

$$\theta = \frac{\pi}{N}\left(y - \frac{N+1}{2}\right) \quad (15)$$

The ray associate with point (x, y) comprises all 3D points that can be expressed as $$d\begin{bmatrix}\sin(\varphi)\cos(\theta)\\ \sin(\theta)\\ \cos(\varphi)\cos(\theta)\end{bmatrix}, d>0 \quad (16)$$

The pixel at position (x, y) is assumed to carry color information or luma and chroma information observed along this ray, projected to a 2D image. Each such ray passes through point (0,0,0) which is the center of the projection.

In practice, as the viewpoint shifts, the rays captured by the camera do not all originate at (0,0,0). The image representation including VSC allows identifying the actual origin of the ray. The ray corresponding to a pixel (x, y) in the image that includes VSC can be expressed as $$s(x,y)\begin{bmatrix}\sin(\varphi_0)\cos(\theta_0)\\ \sin(\theta_0)\\ \cos(\varphi_0)\cos(\theta_0)\end{bmatrix} + d\begin{bmatrix}\sin(\varphi)\cos(\theta)\\ \sin(\theta)\\ \cos(\varphi)\cos(\theta)\end{bmatrix}, d>0. \quad (17)$$

where $\varphi_0$ and $\theta_0$ are viewpoint shift direction angles, described by equations (10)-(11), and s(x,y) is the magnitude or amount of the viewpoint shift recorded in VSC at the pixel position (x,y).

Thereafter, whether on the local or current device or on a remote device, the adjusted 2D image points or rays in 3D then can be used for many different applications such as 3D modeling or reconstruction, virtual, augmented, or mixed reality, many different computer vision applications and tasks including surveillance camera systems, vehicle camera systems, medical scopes, gaming systems, and so forth.

It will be appreciated that with the disclosed processes, converting a captured wide angle or fisheye image to a proposed device independent format, by one example form, uses only the camera calibration techniques using non-central projection models that support viewpoint shift as described above to obtain viewpoint shift data. Detailed depth information that typically accompanies complex algorithms are not required.

Also as mentioned, similar to the ERP and other central projection formats, since the disclosed processes are device independent. The viewpoint shift methods and system disclosed herein is therefore suitable for software and hardware device interfaces and related standards. The disclosed method and system can simplify the development and deployment of state-of-the-art computational imaging and computer vision algorithms since the same maintenance of viewpoint shift data can be used with many different devices and programs, such as those used for capturing AR/VR content for immersive viewing experiences, capturing 3D scene models, or those supporting autonomous driving systems or navigation for drones, robots, etc.

The disclosed process also can be fully backward compatible with the currently used representations. Existing algorithms, including central projection techniques, using standard omnidirectional data formats either can be improved by incorporating the viewpoint shift magnitude and direction information and considering rays in 3D that originate at points other than (0,0,0), or the existing algorithms can be applied to the image data as received and merely omit analysis of the viewpoint shift magnitude channel and direction metadata information.

It also will be appreciated that the examples disclosed herein to generate and maintain viewpoint shift data of an image represents the output of a single camera, in which case the viewpoint is shifted for all image pixels in the same direction and the viewpoint shift data of each pixel only includes the information about the magnitude of the shift. However, the direction of viewpoint shift can be different for individual or each pixel when the optical system exhibits severe decentering that needs to be fully characterized to achieve desired accuracy, or when the omnidirectional image comprises the output of several cameras. In these cases, instead of adding one channel representing the shift magnitude, three additional channels would be included. One channel can carry the magnitude of viewpoint shift, same as the VSC described above. The other two channels may carry the shift direction information, such $x_0$ and $y_0$ or as $\varphi_0$ and $\theta_0$ of equations (12)-(13), respectively, which now would have a different value for each (x, y). Other ways of recording the viewpoint shift for each pixel are also possible.

For example, any one or more of the operations of the processes in FIGS. 6, 7A and 7B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 12:
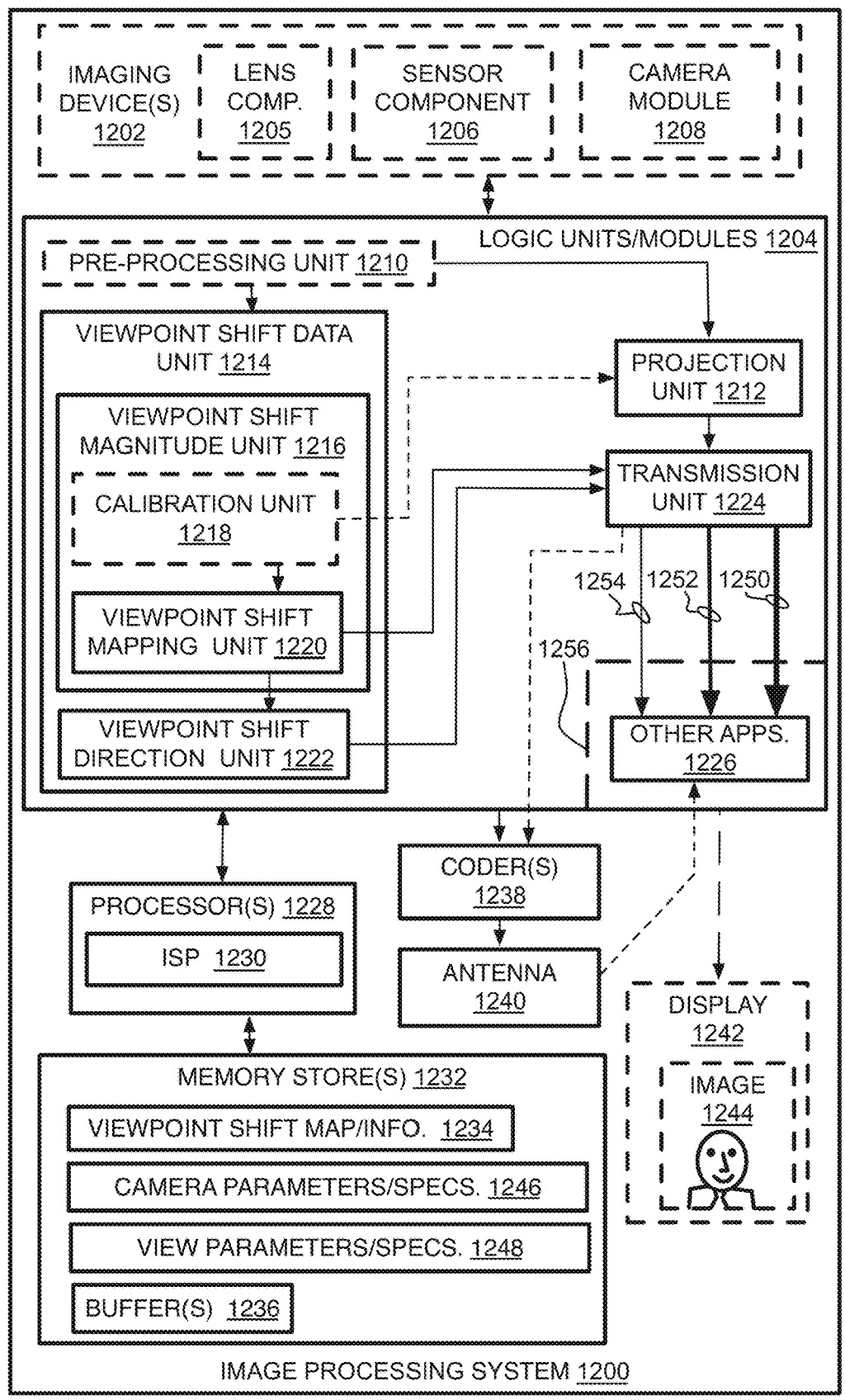
FIG. 12 is an illustrative diagram of an example system to perform a method of image processing of omnidirectional images with a viewpoint shift according to at least one of the implementations herein.

Referring to FIG. 12, an example image processing system 1200 is arranged in accordance with at least some implementations of the present disclosure. In various implementations, the example image processing system 1200 may have an imaging device 1202 to form or receive captured image data. This can be implemented in various ways. Thus, in one form, the image processing system 1200 may be a digital camera or other image capture device that captures photographs or video, and imaging device 1202, in this case, may be the camera hardware and camera sensor software, module, or component 1208. In other examples, imaging processing system 1200 may have an imaging device 1202 that includes or may be one or more cameras, and logic modules 1204 may communicate remotely with, or otherwise may be communicatively coupled to, the imaging device 1202 for further processing of the image data.

In either case, such technology may include one or more cameras such as a digital camera system, a camera array, a dedicated camera device, or an imaging phone, whether a still picture or video camera or some combination of both. Thus, in one form, imaging device 1202 may include camera hardware and optics including one or more fisheye, wide angle camera, or ultra-wide angle camera, each having corresponding lenses 1205. As used herein, a fisheye camera is a camera that includes a fisheye lens that produces strong visual distortion intended to create a wide panoramic or hemispherical image, and causes a viewpoint shift as described above. In various examples, the cameras 1202 may be a single omnidirectional camera. As used herein, an omnidirectional camera is a camera with a field of view (FOV) sufficient to cause an axial viewpoint shift as described above, and by one form, may have the FOV approaching or larger than 180 degrees. In some examples, the cameras 1202 may be catadioptric cameras. For example, catadioptric cameras may include an optical system that involves both the reflecting and refracting of light. Each of the cameras 1202 may capture an image such as the image 100 of FIG. 1.

The camera(s) 1202 also may have sensors 1206 as well as auto-focus, zoom, aperture, ND-filter, auto-exposure, flash, and actuator controls. These controls may be part of a sensor module or component 1208 for operating at least the sensor. The sensor component 1206 and camera module 1208 may be part of the imaging device 1202, or may be part of the logic modules 1204 or both. By one form, camera module 1208 includes a camera interface that is part of the logic modules 1204. Such sensor component can be used to generate images for a viewfinder and take still pictures or video. The image sensor 1206 may have an RGB Bayer color filter or other types of filters, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor also may support other types of electronic shutters, such as global shutter in addition to, or instead of, rolling shutter, and many other shutter types. In some examples, imaging device 1202 may be provided with an eye tracking camera.

In the illustrated example, the logic modules 1204 may include a pre-processing unit 1210, a viewpoint shift data unit 1216 with a calibration unit 1218, viewpoint shift mapping unit 1220, and a viewpoint shift direction unit 1222, a projection unit 1212, a transmission unit 1224, and other applications 1226 that can use the projected images and viewpoint shift information. The calibration unit 1218 may use a non-central polynomial-based camera model augmented with an axial viewpoint shift that can be computed and used as the viewpoint shift magnitude for further image processing as described above.

The transmission unit 1224 forms the representative image data channel(s) 1250, viewpoint shift data channel 1252, and viewpoint shift metadata 1254 and as described above. It should be noted that the metadata 1254 is shown separate here merely as an explanatory representation, and actually may be in the same bitstream or channel as the viewpoint shift magnitudes or image data, such as in headers, and is not necessarily a separate stream or channel. As indicated by dashed line 1256, the applications 1226 receiving the viewpoint shift and image data may or may not be considered part of the logic modules 1204, or may be remote from image processing system 1200. When applications are remote, a coder 1238 may receive the image and viewpoint shift data from the transmission unit 1224 and to encode or compress the data for remote wireless or wired transmission to the applications 1226. In this case, the coder 1228 may perform packing operations to place the channels and metadata into a bitstream for remote transmission. Each of the components, units, or modules described for image processing system 1200 perform the operations mentioned above for methods 600, 700, or 750 where the operation is associated with the title of the module, unit, of component unless context suggests otherwise.

The image processing system 1200 may have one or more of processors 1228 which may include dedicated image signal processor(s) (ISPs) 1230 such as the Intel Atom, memory stores 1232, one or more displays 1242, the coder 1238 which may include an encoder, decoder or both, and antenna 1240. In one example implementation, the image processing system 1200 may have the display 1242, at least one processor 1228 communicatively coupled to the display, at least one memory 1232 communicatively coupled to the processor and having the buffer 1236 or other memories by one example for storing the viewpoint shift map and viewpoint directions (or generally information) 1234 as described above, camera parameters or specifications 1246, and view parameters or specifications 1248. The other buffers 1236 may store camera related or image processing related data.

The coder 1238 and antenna 1240 may be provided to compress the modified image date for transmission to other devices that may analyze, modify, process, display, and/or store the image. It will be understood that the coder 1238 of the image processing system 1200 also may include a decoder to receive and decode image data for processing by the system 1200 to provide projection representations or images, such as disclosed by process 7B.

Other applications 1226 may combine several images, or combine an image and additional information (such as a 3D model of a scene for example). The output of such an application may be an image, but also could be some extracted information about the scene (depth information, 3D scene model, position of some particular objects in 3D, etc.).

Otherwise, the processed image 1244 may be displayed on display 1242 or stored in memory 1232. As illustrated, any of these components may be capable of communication with one another and/or communication with portions of logic modules or units 1204 and/or imaging device 1202. Thus, processors 1228 may be communicatively coupled to both the image device 1202 and the logic units/modules 1204 for operating those components. By one approach, although image processing system 1200, as shown in FIG. 12, may include one particular set of modules, units, or components associated with particular actions or operations as mentioned above, these modules, units, and components are not necessarily always limited to those operations and actions. Operations or actions may be associated with different components or modules than the particular component or module illustrated here.

Figure 13:
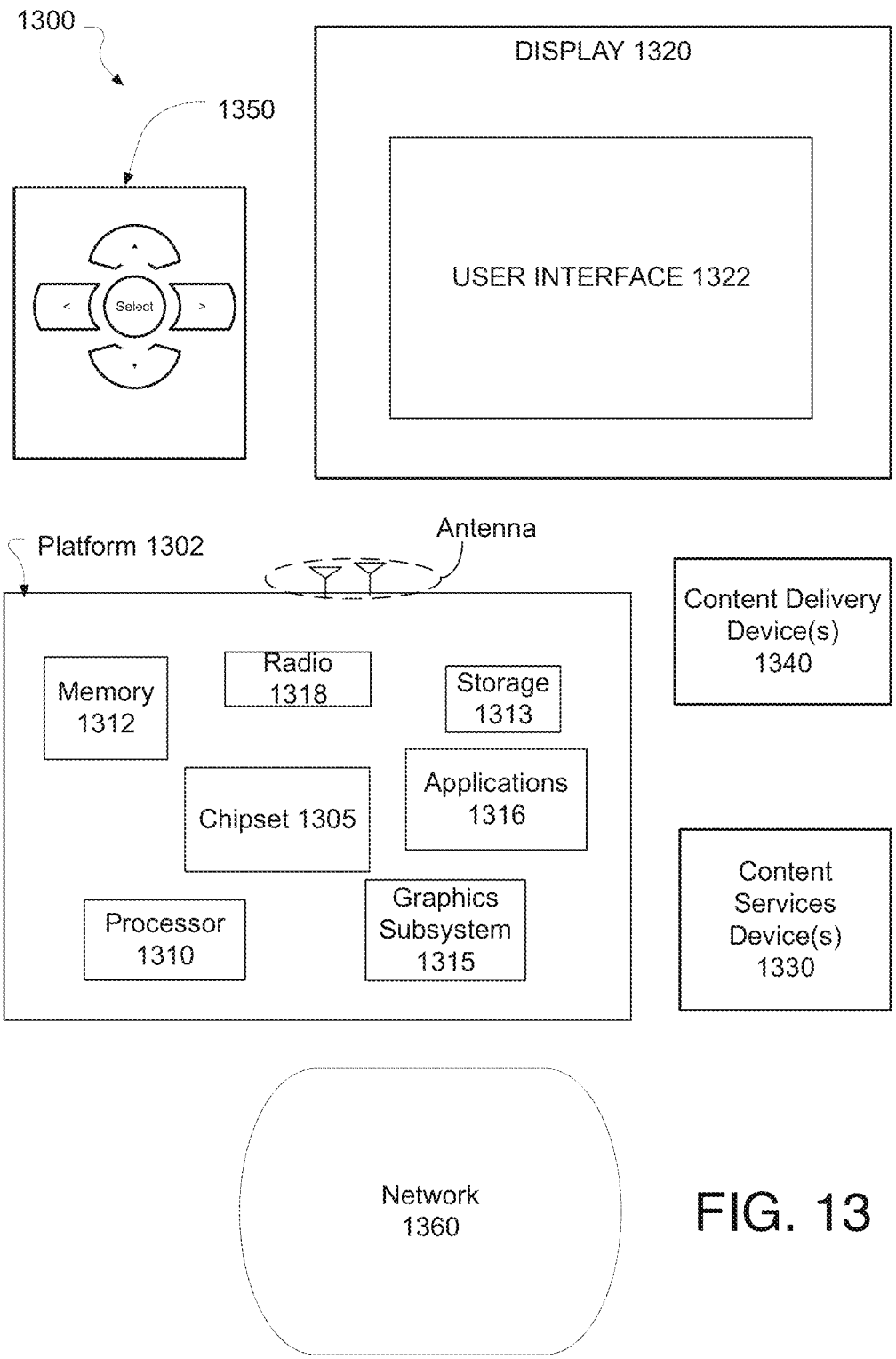
FIG. 13 is an illustrative diagram of another example system.

Referring to FIG. 13, an example system 1300 in accordance with the present disclosure operates one or more aspects of the image processing system 1200 described herein. It will be understood from the nature of the system components described below that such components may be associated with, or used to operate, certain part or parts of the image processing system described above. In various implementations, system 1300 may be a media system although system 1300 is not limited to this context. For example, system 1300 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, vehicle, security, medical, and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
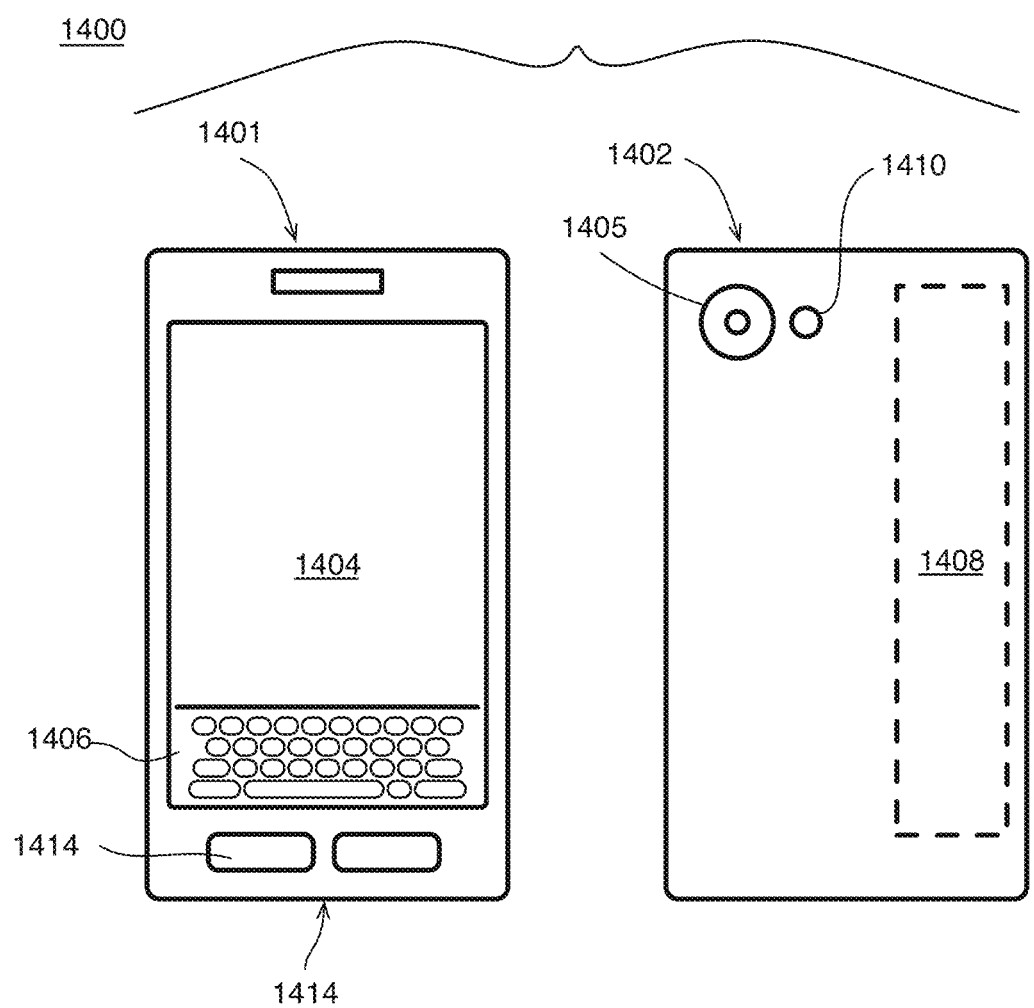
FIG. 14 illustrates another example device, all arranged in accordance with at least some implementations of the present disclosure.

Referring to FIG. 14, a small form factor device 1400 is one example of the varying physical styles or form factors in which systems 1000 or 1100 may be embodied. By this approach, device 1400 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, a touch sensitive screen, input keys, buttons, switches, microphones, speakers, voice recognition device and software, and so forth. Information also may be entered into device 1400 by way of microphone 1414, or may be digitized by a voice recognition device. As shown, device 1400 may include a camera 1405 (e.g., including at least one fisheye or wide angle lens, aperture, and imaging sensor) and a flash 1410 integrated into back 1402 (or elsewhere) of device 1400. The implementations are not limited in this context.

Device 1400 could have both front and back cameras which could be used together to capture 360 degree images, and viewpoint shift information could be useful for artifact free stitching of the actual captured images from the multiple cameras into a single 360 degree image or omnidirectional 3D stereo image.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, at least one non-transitory computer-readable medium having instructions thereon that when executed cause a computing device to operate by: obtaining image data of at least one image captured by at least one imaging device; generating viewpoint shift data indicating a viewpoint shift associated with the generation of the image data of the at least one image; and separately providing both the image data and the viewpoint shift data to image processing applications to modify the image data depending on the viewpoint shift data.

By one or more second implementation, and further to the first implementation, wherein view point shift magnitudes of the viewpoint shift data are provided as a viewpoint shift channel separate from one or more channels providing chroma or brightness or both image data.

By one or more third implementations, and further to the first or second implementation, wherein at least some of the viewpoint shift data is embedded in metadata to be transmitted with the image data.

By one or more fourth implementations, and further to any of the first to third implementation, wherein a viewpoint shift direction included in the viewpoint shift data is embedded in metadata.

By one or more fifth implementations, and further to any of the first to third implementation, wherein a viewpoint shift direction included in the viewpoint shift data is embedded in metadata, and wherein the metadata accompanies a viewpoint shift channel carrying magnitudes of the viewpoint shifts.

By one or more sixth implementations, and further to any of the first to third implementation, wherein a viewpoint shift direction included in the viewpoint shift data is embedded in metadata, and wherein the metadata is placed in an image or sequence header.

By one or more seventh implementations, and further to any of the first to sixth implementation, wherein the method comprising, wherein the viewpoint shift data is maintained as a viewpoint shift map where gray-scale values of pixel locations on the viewpoint shift map represent a length of the viewpoint shift.

By one or more eighth implementations, and further to any of the first to seventh implementation, wherein the viewpoint shift data is generated without using incident angle values.

By one or more ninth implementations, and further to any of the first to eighth implementation, wherein viewpoint shift magnitudes of the viewpoint shift data is formed by using a non-central projection, polynomial-based calibration of the imaging device.

By one or more tenth implementations, and further to any of the first to ninth implementation, wherein the viewpoint shift direction is determined by using a rotation matrix of an image.

By an example one or more eleventh implementations, a system of image processing comprises memory; and at least one processor communicatively coupled to the memory and being arranged to operate by: obtaining image data of at least one image captured by at least one imaging device, generating viewpoint shift data indicating a shift of a viewpoint associated with the generation of the image data of the at least one image, and separately providing both the image data and the viewpoint shift data to image processing applications to modify the image data depending on the viewpoint shift data.

By one or more twelfth implementations, and further to the eleventh implementation, wherein the viewpoint shift data includes a viewpoint shift direction to be transmitted as metadata.

By one or more thirteenth implementations, and further to the eleventh implementation, wherein the viewpoint shift data includes a viewpoint shift direction to be transmitted as metadata, and wherein the metadata is placed in a sequence or image header.

By one or more fourteenth implementations, and further to the eleventh implementation, wherein the viewpoint shift data includes a viewpoint shift direction to be transmitted as metadata, and wherein the viewpoint shift direction is at least partly based on a rotation matrix that indicates a change from a camera orientation to a selected view orientation.

By one or more fifteenth implementations, and further to the eleventh implementation, wherein the viewpoint shift data includes a viewpoint shift direction to be transmitted as metadata, wherein the viewpoint shift direction is at least partly based on a rotation matrix that indicates a change from a camera orientation to a selected view orientation, and wherein the viewpoint shift direction is expressed using a rotation matrix or a parameterization of a rotation matrix.

By one or more sixteenth implementations, and further to the eleventh implementation, wherein the viewpoint shift data includes a viewpoint shift direction to be transmitted as metadata, and wherein the viewpoint shift direction is expressed as a pixel position in the omnidirectional image.

By one or more seventeenth implementations, and further to the eleventh implementation, wherein the viewpoint shift data includes a viewpoint shift direction to be transmitted as metadata, and wherein the viewpoint shift direction is provided as angles of a ray that indicates the direction.

By an example one or more eighteenth implementations, a method of image processing comprises obtaining image data of at least one image captured by at least one imaging device; generating viewpoint shift data indicating a viewpoint shift associated with the generation of the image data of the at least one image; and separately providing both the image data and the viewpoint shift data to image processing applications to modify the image data depending on the viewpoint shift data.

By one or more nineteenth implementations, and further to the eighteenth implementations, wherein view point shift magnitudes of the viewpoint shift data are provided as a viewpoint shift channel separate from one or more channels providing chroma or luma or both image data.

By one or more twentieth implementations, and further to the eighteenth or nineteenth implementations, wherein view point shift magnitudes of the viewpoint shift data are maintained as a viewpoint shift map.

By one or more twenty-first implementations, and further to the eighteenth or nineteenth implementations, wherein view point shift magnitudes of the viewpoint shift data are maintained as a viewpoint shift map, and wherein the viewpoint shift map comprises initial values scaled to fit a bit-depth the same as chroma or luma channels of the same image.

By one or more twenty-second implementations, and further to the eighteenth or nineteenth implementations, wherein view point shift magnitudes of the viewpoint shift data are maintained as a viewpoint shift map, and wherein the viewpoint shift map is downsampled by at least a factor of eight.

By one or more twenty-third implementations, and further to the eighteenth implementations, wherein the viewpoint shift data is provided in multiple channels as at least one of: (1) a magnitude of viewpoint shift in each of x, y, and z directions each with its own channel, and (2) the magnitude of the shift and two angles describing a direction of the shift each with its own channel.

By one or more twenty-fourth implementations, and further to any of the eighteenth to twenty-third implementations, wherein viewpoint shift data comprises a viewpoint shift direction in the form of a three-element rotation vector.

By one or more twenty-fifth implementations, and further to any of the eighteenth to twenty-third implementations, wherein the viewpoint shift data comprises a viewpoint shift direction of each image and that is represented as coordinates of a point on an equirectangular projection (ERP) image or angles of the point.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. At least one non-transitory computer-readable medium comprising instructions to cause a computing device to at least:
   obtain image data of at least one image captured by at least one imaging device;
   generate viewpoint shift data indicating a viewpoint shift associated with generation of the image data of the at least one image; and
   separately provide both the image data and the viewpoint shift data to image processing applications to modify the image data depending on the viewpoint shift data, wherein viewpoint shift magnitudes of the viewpoint shift data are provided as at least one viewpoint shift channel separate from one or more channels providing chroma or brightness or both image data.

2. The at least one non-transitory computer-readable medium of claim 1, wherein view point shift directions of the viewpoint shift data are provided as at least one viewpoint shift channel separate from the one or more channels providing chroma or brightness or both image data.

3. The at least one non-transitory computer-readable medium of claim 1, wherein at least some of the viewpoint shift data is embedded in metadata to be transmitted with the image data.

4. The at least one non-transitory computer-readable medium of claim 1, wherein a viewpoint shift direction included in the viewpoint shift data is embedded in metadata.

5. The at least one non-transitory computer-readable medium of claim 4, wherein the metadata accompanies a viewpoint shift channel carrying a magnitude of the viewpoint shift.

6. The at least one non-transitory computer-readable medium of claim 4, wherein the metadata is placed in an image or sequence header.

7. The at least one non-transitory computer-readable medium of claim 1, wherein the viewpoint shift data is maintained as a viewpoint shift map, wherein gray-scale values of pixel locations on the viewpoint shift map represent a length of the viewpoint shift.

8. The at least one non-transitory computer-readable medium of claim 1, wherein the viewpoint shift data is generated without using incident angle values.

9. The at least one non-transitory computer-readable medium of claim 1, wherein the viewpoint shift magnitudes of the viewpoint shift data are formed by using a non-central projection, polynomial-based calibration of the imaging device.

10. The at least one non-transitory computer-readable medium of claim 1, wherein a viewpoint shift direction is determined by using a rotation matrix of an image.

11. A system of image processing, the system comprising:
memory; and
at least one processor communicatively coupled to the memory and being arranged to:
obtain image data of at least one image captured by at least one imaging device,
generate viewpoint shift data indicating a shift of a viewpoint associated with generation of the image data of the at least one image, and
separately provide both the image data and the viewpoint shift data to image processing applications to modify the image data depending on the viewpoint shift data, wherein viewpoint shift magnitudes of the viewpoint shift data are provided as at least one viewpoint shift channel separate from one or more channels providing chroma or brightness or both image data.

12. The system of claim 11, wherein the viewpoint shift data includes a viewpoint shift direction to be transmitted as metadata.

13. The system of claim 12, wherein the metadata is placed in a sequence or image header.

14. The system of claim 12, wherein the viewpoint shift direction is at least partly based on a rotation matrix that indicates a change from a camera orientation to a selected view orientation.

15. The system of claim 12, wherein the viewpoint shift direction is expressed using a rotation matrix or a parameterization of the rotation matrix.

16. The system of claim 12, wherein the viewpoint shift direction is expressed as a pixel position in the at least one image.

17. The system of claim 12, wherein the viewpoint shift direction is provided as angles of a ray that indicates the direction.

18. A method of image processing, the method comprising:
obtaining image data of at least one image captured by at least one imaging device;
generating viewpoint shift data indicating a viewpoint shift associated with generation of the image data of the at least one image; and
separately providing both the image data and the viewpoint shift data to image processing applications to modify the image data depending on the viewpoint shift data, wherein viewpoint shift magnitudes of the viewpoint shift data are provided as at least one viewpoint shift channel separate from one or more channels providing chroma or brightness or both image data.

19. The method of claim 18, wherein viewpoint shift directions of the viewpoint shift data are provided as at least one viewpoint shift channel separate from the at least one viewpoint shift channel of the viewpoint shift magnitudes and the one or more channels providing chroma or luma or both image data.

20. The method of claim 18, wherein the viewpoint shift magnitudes of the viewpoint shift data are maintained as a viewpoint shift map.

21. The method of claim 20, wherein the viewpoint shift map includes initial values scaled to fit a bit-depth the same as chroma or luma channels of the same image.

22. The method of claim 20, wherein the viewpoint shift map is downsampled by at least a factor of eight.

23. The method of claim 18, wherein the viewpoint shift data is provided in multiple channels as at least one of: (1) a magnitude of viewpoint shift in each of x, y, and z directions each with its own channel, or (2) the magnitude of the shift and two angles describing a direction of the shift each with its own channel.

24. The method of claim 18 wherein the viewpoint shift data includes a viewpoint shift direction in the form of a three-element rotation vector.

25. The method of claim 18, wherein the viewpoint shift data includes a viewpoint shift direction that is represented as coordinates of a point on an equirectangular projection (ERP) image or angles of the point.

* * * * *

UNITED STATES PATENT AND TRADEMARK OFFICE
CERTIFICATE OF CORRECTION

| | | |
|---|---|---|
| PATENT NO. | : 11,978,177 B2 | |
| APPLICATION NO. | : 17/033310 | |
| DATED | : May 7, 2024 | |
| INVENTOR(S) | : Tezaur et al. | |

It is certified that error appears in the above-identified patent and that said Letters Patent is hereby corrected as shown below:

In the Drawings

Sheet 4, FIG. 6, above reference numeral 606, replace "IMAGE PROCESING" with --IMAGE PROCESSING--

Signed and Sealed this
Thirtieth Day of July, 2024

Katherine Kelly Vidal
*Director of the United States Patent and Trademark Office*